(12) United States Patent
Zheng et al.

(10) Patent No.: US 8,184,732 B2
(45) Date of Patent: May 22, 2012

(54) METHOD AND SYSTEM FOR CODEBOOK DESIGN FOR PRE-CODING TECHNIQUES

(75) Inventors: Jun Zheng, San Diego, CA (US); Vinko Erceg, Cardiff, CA (US); Mark Kent, Vista, CA (US)

(73) Assignee: Broadcom Corporation, Irvine, CA (US)

( * ) Notice: Subject to any disclaimer, the term of this patent is extended or adjusted under 35 U.S.C. 154(b) by 1058 days.

(21) Appl. No.: 12/111,299

(22) Filed: Apr. 29, 2008

(65) Prior Publication Data

US 2008/0272953 A1      Nov. 6, 2008

Related U.S. Application Data

(60) Provisional application No. 60/915,150, filed on May 1, 2007.

(51) Int. Cl.
*H04B 7/02* (2006.01)
(52) U.S. Cl. .................................... 375/267; 375/260
(58) Field of Classification Search .................. 375/260, 375/267, 347, 299, 146
See application file for complete search history.

(56) References Cited

U.S. PATENT DOCUMENTS

| | | | | |
|---|---|---|---|---|
| 6,363,121 | B1 * | 3/2002 | Hochwald et al. | 375/260 |
| 6,724,842 | B1 * | 4/2004 | Hochwald et al. | 375/347 |
| 2006/0034383 | A1 * | 2/2006 | Su et al. | 375/267 |
| 2007/0109954 | A1 * | 5/2007 | Pasanen et al. | 370/204 |
| 2008/0063110 | A1 * | 3/2008 | Averbuch et al. | 375/295 |

OTHER PUBLICATIONS

"Precoding Codebook Design for 4 Node-B Antenna", 3GPP TSG RAN WG1 48bis, Texas Instruments, Agenda Item: 7.9.1, St. Julian's, Malta, Mar. 26-30, 2007, pp. 1-11.
"Way Forward on 4-Tx Antenna Codebook for SU-MIMO", 3GPP TSG RAN WG1 48bis, Texas Instruments, Motorola, Nokia, Freescale Semiconductor, Nortel, NTT DoCoMo, Panasonic, Huawei, Broadcom, Comsys, Marvell Semiconductor, Mitsubishi Electric, Agenda Item: 7.9.1, St. Julian's, Malta, Mar. 26-30, 2007, pp. 1-3.
"Codebook Design for E-UTRA MIMO Pre-Coding", 3GPP TSG RAN WG1 46bis, Texas Instruments, Agenda Item: 6.6.5, Seoul, Korea, Oct. 9-13, 2006, pp. 1-8.

* cited by examiner

*Primary Examiner* — Emmanuel Bayard
(74) *Attorney, Agent, or Firm* — Thomas, Kayden, Horstemeyer & Risley, LLP

(57) ABSTRACT

Aspects of a method and system for codebook design for pre-coding techniques may include generating one or more matrices whose matrix elements are from a constant amplitude signal constellation, wherein each of the one or more generated matrices may comprise one or more orthonormal columns, and one of the generated one or more matrices may be an identity matrix. Any two of the generated one or more matrices may be separated by at least a minimum pairwise distance. One or more pre-coding codebooks may be generated, each of which may comprise one or more codebook elements that may be of a same matrix rank. Each of the codebook elements may be generated from a subset of columns from one of the generated one or more matrices. A signal may be pre-coded for transmission using the one or more pre-coding codebooks.

20 Claims, 8 Drawing Sheets

METHOD AND SYSTEM FOR CODEBOOK DESIGN FOR PRE-CODING TECHNIQUES

CROSS-REFERENCE TO RELATED APPLICATIONS/INCORPORATION BY REFERENCE

This application makes reference to, claims priority to, and claims the benefit of U.S. Provisional Application Ser. No. 60/915,150, filed on May 1, 2007.

FIELD OF THE INVENTION

Certain embodiments of the invention relate to signal processing for communication systems. More specifically, certain embodiments of the invention relate to a method and system for codebook design for pre-coding techniques.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase throughput and, in turn, offer advanced QoS capabilities and speeds that rival those delivered by cable modem and/or DSL service providers. Recently, advances in multiple antenna technology and other physical layer technologies have started to significantly increase available communications data rates.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for codebook design for pre-coding techniques, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for codebook design for pre-coding techniques. Aspects of the method and system for codebook design for pre-coding techniques may comprise generating one or more matrices whose matrix elements are from a constant amplitude signal constellation, wherein each of the one or more generated matrices may comprise one or more orthonormal columns, and one of the generated one or more matrices may be an identity matrix. Any two of the generated one or more matrices may be separated by at least a minimum pairwise distance. One or more pre-coding codebooks may be generated, each of which may comprise one or more codebook elements that may be of a same matrix rank. Each of the codebook elements may be generated from a subset of columns from one of the generated one or more matrices. A signal may be pre-coded for transmission using the one or more pre-coding codebooks.

The generated one or more matrices may be selected from a plurality of sets of one or more matrices based on the minimum pairwise distance. The minimum pairwise distance may be set to an arbitrary value. The one or more matrices may be generated from a set of generating vectors, using a householder transformation, wherein elements of the set of generating vectors may be selected randomly from the constant amplitude signal constellation. The constant amplitude signal constellation may be a QPSK or an 8-PSK signal constellation. The one or more matrices may be unitary when the one or more matrices are square matrices. The transmission signal may comprise a number of spatial streams equal to the matrix rank of the codebook elements of the one or more pre-coding codebooks used to generate the transmission signal.

Figure 1A:
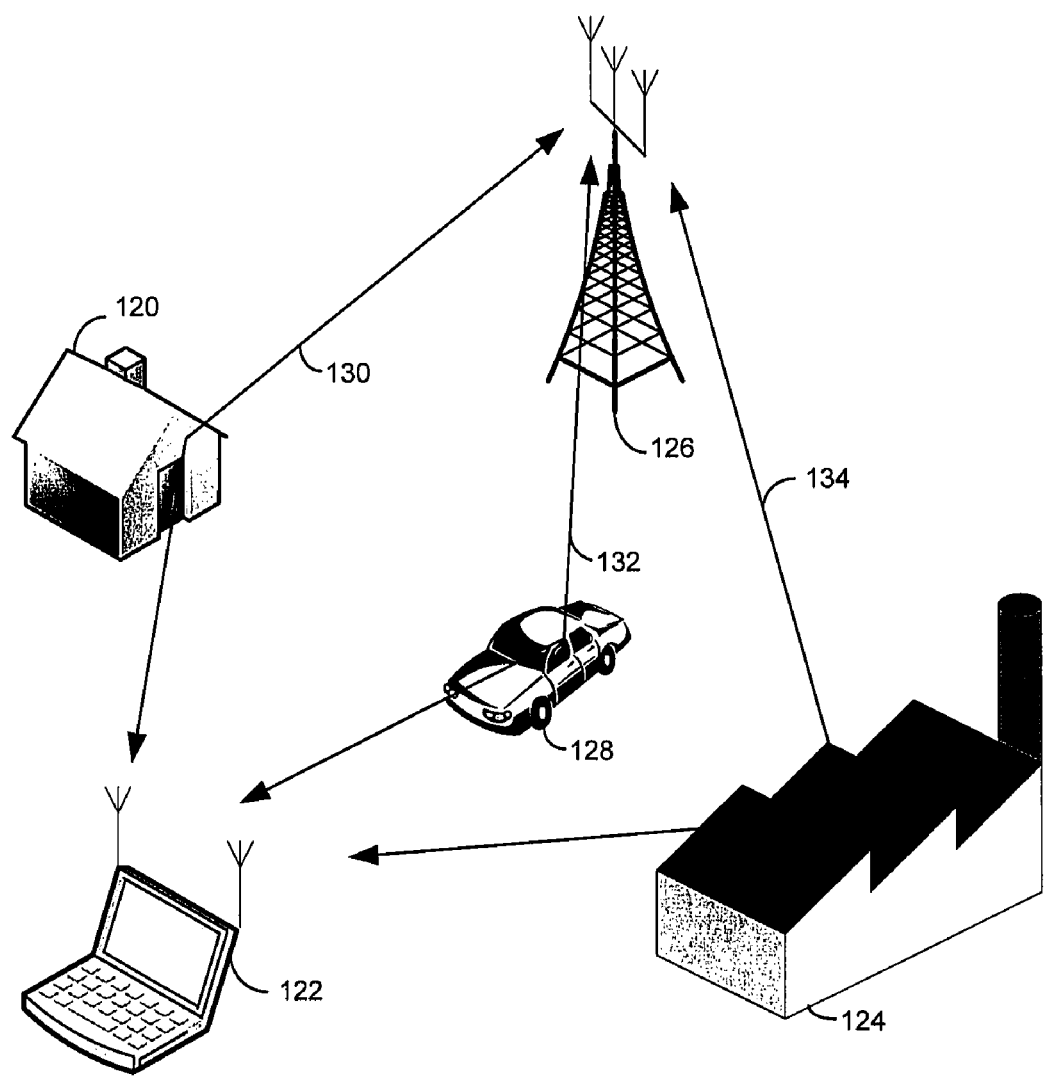
FIG. 1A is a diagram illustrating exemplary cellular multipath communication between a base station and a mobile computing terminal, in connection with an embodiment of the invention.

FIG. 1A is a diagram illustrating exemplary cellular multipath communication between a base station and a mobile computing terminal, in connection with an embodiment of the invention. Referring to FIG. 1A, there is shown a house 120, a mobile terminal 122, a factory 124, a base station 126, a car 128, and communication paths 130, 132 and 134.

The base station 126 and the mobile terminal 122 may comprise suitable logic, circuitry and/or code that may be enabled to generate and process MIMO communication signals.

Wireless communications between the base station 126 and the mobile terminal 122 may take place over a wireless channel. The wireless channel may comprise a plurality of communication paths, for example, the communication paths 130, 132 and 134. The wireless channel may change dynamically as the mobile terminal 122 and/or the car 128 moves. In some cases, the mobile terminal 122 may be in line-of-sight (LOS) of the base station 126. In other instances, there may not be a direct line-of-sight between the mobile terminal 122 and the base station 126 and the radio signals may travel as reflected communication paths between the communicating entities, as illustrated by the exemplary communication paths 130, 132 and 134. The radio signals may be reflected by man-made structures like the house 120, the factory 124 or the car 128, or by natural obstacles like hills. Such a system may be referred to as a non-line-of-sight (NLOS) communications system.

A communication system may comprise both LOS and NLOS signal components. If a LOS signal component is present, it may be much stronger than NLOS signal components. In some communication systems, the NLOS signal components may create interference and reduce the receiver performance. This may be referred to as multipath interference. The communication paths 130, 132 and 134, for example, may arrive with different delays at the mobile terminal 122. The communication paths 130, 132 and 134 may also be differently attenuated. In the downlink, for example, the received signal at the mobile terminal 122 may be the sum of differently attenuated communication paths 130, 132 and/or 134 that may not be synchronized and that may dynamically change. Such a channel may be referred to as a fading multipath channel. A fading multipath channel may introduce interference but it may also introduce diversity and degrees of freedom into the wireless channel. Communication systems with multiple antennas at the base station and/or at the mobile terminal, for example MIMO systems, may be particularly suited to exploit the characteristics of wireless channels and may extract large performance gains from a fading multipath channel that may result in significantly increased performance with respect to a communication system with a single antenna at the base station 126 and at the mobile terminal 122, in particular for NLOS communication systems.

Figure 1B:
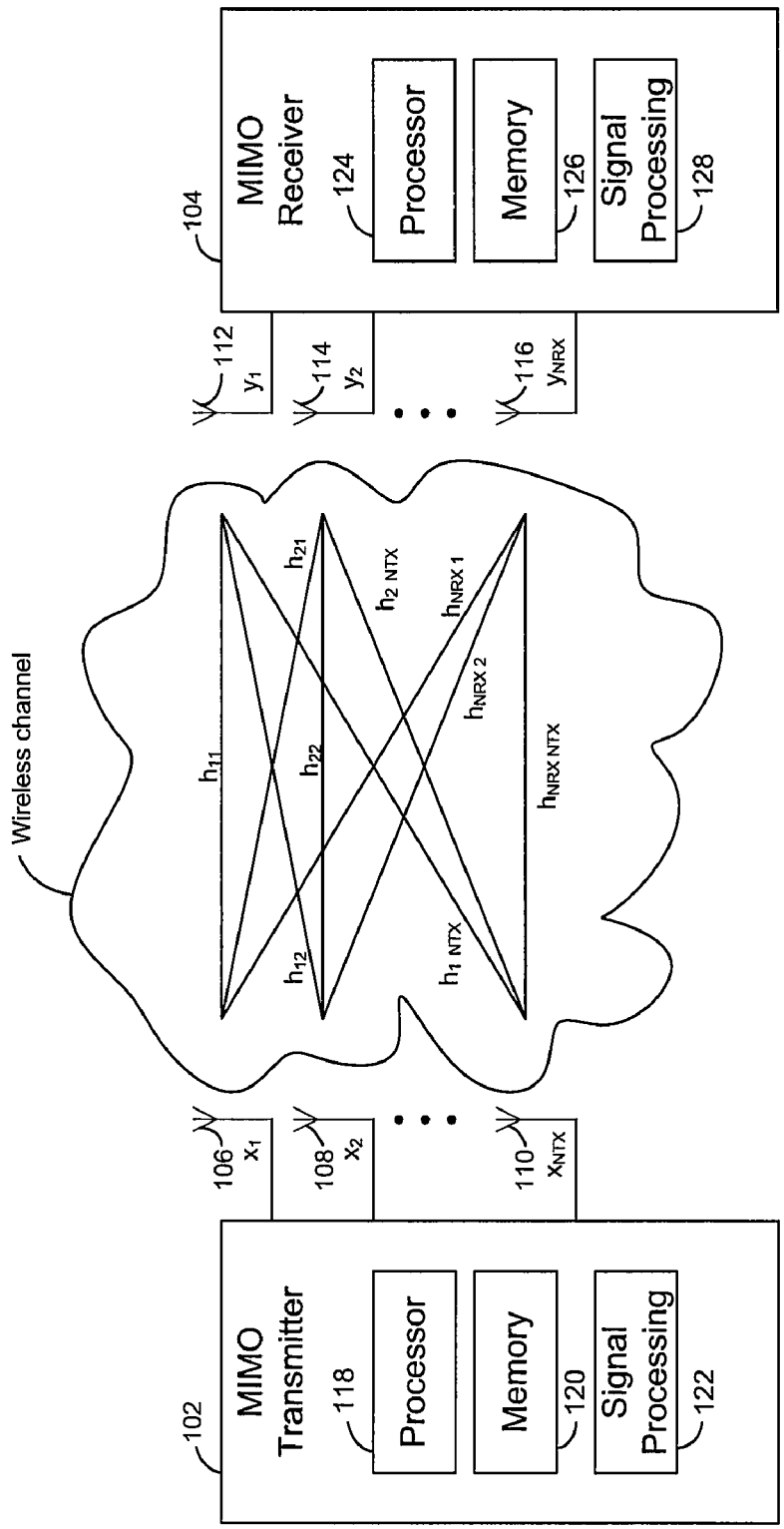
FIG. 1B is a diagram illustrating an exemplary MIMO communication system, in accordance with an embodiment of the invention.

FIG. 1B is a diagram illustrating an exemplary MIMO communication system, in accordance with an embodiment of the invention. Referring to FIG. 1B, there is shown a MIMO transmitter 102 and a MIMO receiver 104, and antennas 106, 108, 110, 112, 114 and 116. The MIMO transmitter 102 may comprise a processor block 118, a memory block 120, and a signal processing block 122. The MIMO receiver 104 may comprise a processor block 124, a memory block 126, and a signal processing block 128. There is also shown a wireless channel comprising communication paths $h_{11}$, $h_{12}$, $h_{22}$, $h_{21}$, $h_{2\ NTX}$, $h_{1\ NTX}$, $h_{NRX\ 1}$, $h_{NRX\ 2}$, $h_{NRX\ NTX}$, where $h_{mn}$ may represent a channel coefficient from transmit antenna n to receiver antenna m. There may be $N_{TX}$ transmitter antennas and $N_{RX}$ receiver antennas. There is also shown transmit symbols $x_1$, $x_2$ and $x_{NTX}$, and receive symbols $y_1$, $y^2$ and $y_{NRX}$.

The MIMO transmitter 102 may comprise suitable logic, circuitry and/or code that may be enabled to generate transmit symbols $x_i$ $i \in \{1,2, \ldots N_{TX}\}$ that may be transmitted by the transmit antennas, of which the antennas 106, 108 and 110 may be depicted in FIG. 1B. The processor block 118 may comprise suitable logic, circuitry, and/or code that may be enabled to process signals. The memory block 120 may comprise suitable logic, circuitry, and/or code that may be enabled to store and/or retrieve information for processing in the MIMO transmitter 102. The signal processing block 122 may comprise suitable logic, circuitry and/or code that may be enabled to process signals, for example in accordance with one or more MIMO transmission protocols. The MIMO receiver 104 may comprise suitable logic, circuitry and/or code that may be enabled to process the receive symbols $y_i$ $i \in \{1,2, \ldots N_{RX}\}$ that may be received by the receive antennas, of which the antennas 112, 114 and 116 may be shown in FIG. 1B. The processor block 124 may comprise suitable logic, circuitry, and/or code that may be enabled to process signals. The memory block 126 may comprise suitable logic, circuitry, and/or code that may be enabled to store and/or retrieve information for processing in the MIMO receiver 104. The signal processing block 128 may comprise suitable logic, circuitry and/or code that may be enabled to process signals, for example in accordance with one or more MIMO protocols. An input-output relationship between the transmitted and the received signal in a MIMO system may be written as:

$$y = Hx + n$$

where $y = [y_1, y_2, \ldots y_{NRX}]^T$ may be a column vector with $N_{RX}$ elements, $.^T$ may denote a vector transpose, $H = [h_{i,j}]$: $i \in \{1,2, \ldots N_{RX}\}$; $j \in \{1,2, \ldots N_{TX}\}$ may be a channel matrix of dimensions $N_{RX}$ by $N_{TX}$, $x = [x_1, x_2, \ldots x_{NTX}]^T$ is a column vector with $N_{TX}$ elements and n is a column vector of noise samples with $N_{RX}$ elements. The channel matrix H may be written, for example, as $H = U\Sigma V^H$ using the Singular Value Decomposition (SVD), where $.^H$ denotes the Hermitian transpose, U is a $N_{RX}$ by $N_{TX}$ unitary matrix, $\Sigma$ is a $N_{TX}$ by $N_{TX}$ diagonal matrix and V is $N_{TX}$ by $N_{TX}$ unitary matrix. Other matrix decompositions that may diagonalize or transform the matrix H may be used instead of the SVD. If the receiver algorithm implemented in MIMO receiver 104 is, for example, an Ordered Successive Interference Cancellation (OSIC), other matrix decompositions that convert the matrix H to lower/upper triangular may be appropriate. One such decomposition may comprise Geometric Mean Decomposition (GMD), where $H = QRP^H$, where R may be upper triangular with the geometric mean of the singular values of H on the diagonal elements, and Q and P may be unitary.

Figure 2:
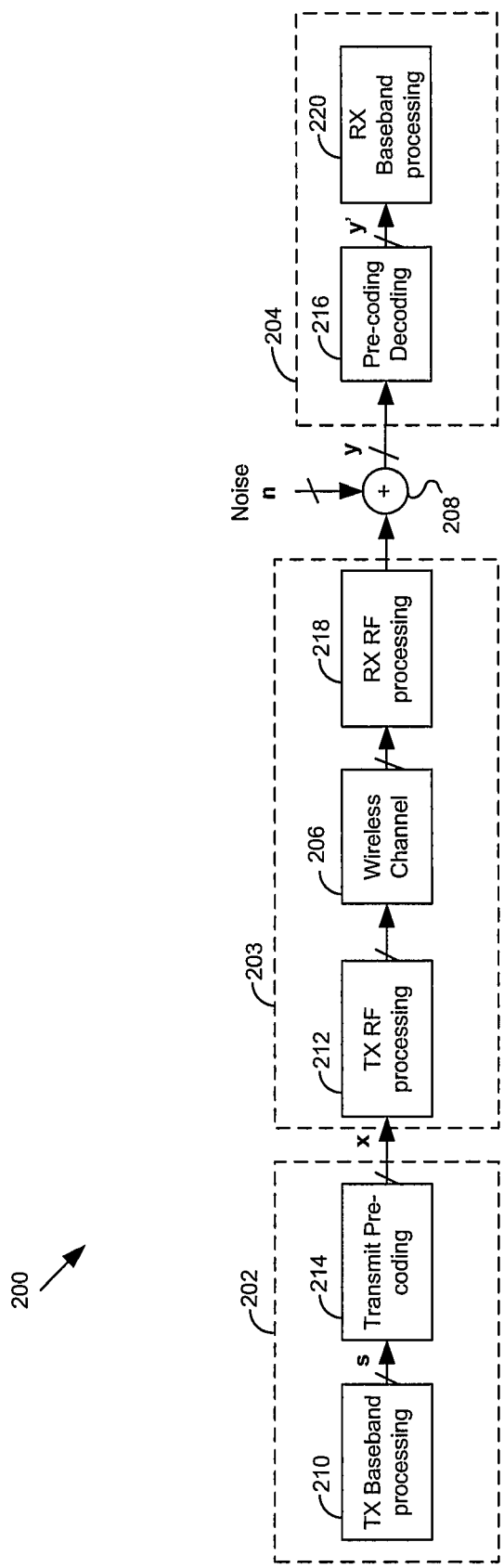
FIG. 2 is a block diagram illustrating an exemplary MIMO transceiver chain model, in accordance with an embodiment of the invention.

FIG. 2 is a block diagram illustrating an exemplary MIMO transceiver chain model, in accordance with an embodiment of the invention. Referring to FIG. 2, there is shown a MIMO system 200 comprising a MIMO transmitter 202, a MIMO baseband equivalent channel 203, a MIMO receiver 204, and an adder 208. The MIMO transmitter 202 may comprise a transmitter (TX) baseband processing block 210 and a transmit pre-coding block 214. The MIMO baseband equivalent channel 203 may comprise a wireless channel 206, a TX radio frequency (RF) processing block 212 and a receiver (RX) RF processing block 218. The MIMO receiver 204 may comprise a pre-coding decoding block 216 and a RX baseband processing block 220. There is also shown symbol vector s, pre-coded vector x, noise vector n, received vector y and channel-decoded vector y'.

The MIMO transmitter 202 may comprise a baseband processing block 210, which may comprise suitable logic, circuitry and/or code that may be enabled to generate a MIMO baseband transmit signal. The MIMO baseband transmit signal may be communicated to a transmit pre-coding block 214. A baseband signal may be suitably coded for transmission over a wireless channel 206 in the transmit pre-coding block 214 that may comprise suitable logic, circuitry and/or code that may enable it to perform these functions. The TX RF processing block 212 may comprise suitable logic, circuitry and/or code that may enable a signal communicated to the TX RF processing block 212 to be modulated to radio frequency (RF) for transmission over the wireless channel 206. The RX RF processing block 218 may comprise suitable logic, circuitry and/or code that may be enabled to perform radio frequency front-end functionality to receive the signal transmitted over the wireless channel 206. The RX RF processing block 218 may comprise suitable logic, circuitry and/or code that may enable the demodulation of its input signals to baseband. The adder 208 may depict the addition of noise to the received signal at the MIMO receiver 204. The MIMO receiver 204 may comprise the pre-coding decoding block 216 that may linearly decode a received signal and communicate it to the RX baseband processing block 220. The RX baseband processing block 220 may comprise suitable logic, circuitry and/or logic that may enable to apply further signal processing to baseband signal.

The MIMO transmitter 202 may comprise a baseband processing block 210, which may comprise suitable logic, circuitry and/or code that may be enabled to generate a MIMO baseband transmit signal. The MIMO baseband transmit signal may be communicated to a transmit pre-coding block 214 and may be the symbol vector s. The symbol vector s may be of dimension $N_{TX}$ by 1.

The transmit pre-coding block 214 may be enabled to apply a linear transformation to the symbol vector s, so that $x=Ws$, where W may be of dimension $N_{TX}$ by length of s, and $x=[x_1, x_2, \ldots, X_{NTX}]^T$. Each element of the pre-coded vector x may be transmitted on a different antenna among $N_{TX}$ available antennas.

The transmitted pre-coded vector x may traverse the MIMO baseband equivalent channel 203. From the $N_{RX}$ receiver antennas, the received signal y may be the signal x transformed by the MIMO baseband equivalent channel 203 represented by a matrix H, plus a noise component given by the noise vector n. As depicted by the adder 208, the received vector y may be given by $y=Hx+n=HWs+n$. The received vector y may be communicated to the pre-coding decoding block 216, where a linear decoding operation B may be applied to the received vector y to obtain the decoded vector $y'=B^H y=B^H HWs+B^H n$, where B may be a complex matrix of appropriate dimensions. The decoded vector y' may then be communicated to the RX baseband processing block 220 where further signal processing may be applied to the output of the pre-coding decoding block 216.

If the transfer function H of the MIMO baseband equivalent channel 203 that may be applied to the transmitted pre-coded vector x is known both at the MIMO transmitter 202 and the MIMO receiver 204, the channel may be diagonalized by, for example, setting $W=V$ and $B=U$, where $H=U\Sigma V^H$ may be the singular value decomposition. In these instances, the channel decoded vector y' may be given by the following relationship:

$$y'=U^H U\Sigma V^H Vs+U^H n=\Sigma s+U^H n$$

Since $\Sigma$ may be a diagonal matrix, there may be no interference between the elements of symbol vector s in y' and hence the wireless communications system may appear like a system with up to $N_{TX}$ parallel single antenna wireless communication systems, for each element of s, up to the rank of channel matrix H which may be less or equal to $N_{TX}$. The operation of applying the matrix W to the vector s may be referred to as pre-coding. The operation of making the wireless system appear like a system of parallel non-interfering data streams due to the use of multiple antennas, may lead to the use of the term spatial data streams since each data stream may originate on different transmit antennas. The number of spatial data streams $1 \leq N_S = r \leq \min\{N_{TX}, N_{RX}\}$ that may be separated or decoupled may be limited by the rank r of the channel matrix H, as described above. Each spatial stream originating at a transmit antenna may be modulated and coded separately.

In many instances, it may be desirable to choose the pre-coding matrix W from a finite set of matrices $\{W\}$, which may be referred to as a codebook. For example, a desirable choice of the pre-coding matrix may be made as a function of the prevailing channel conditions. The performance of a MIMO pre-coding scheme may be directly related to the choice of the codebook for the pre-coding matrices. In accordance with various embodiments of the invention, a pre-coding codebook may be designed so that it may possess various exemplary properties. For example, (i) each element of the codebook $\{W\}=\{W_i\}$; $\forall i \in 0,1, \ldots, L<\infty$, that is, candidate pre-coding matrix $W_i$, may be unitary (for square matrices) or an orthonormal column matrix (for non-square matrices). In this case, the transmit signal power may remain similar before and after pre-coding, since $W^H W=I$; (ii) The codebook may have desirable pair-wise "distance" properties, that is, elements of the codebook $W_i$ may be sufficiently separated, according to some distance measure. Thus, the codebook $\{W\}$ may sample the space spanned by possible pre-coding matrices approximately uniformly; (iii) The identity matrix may be comprised in the codebook. This may be desirable in some scenarios that may comprise antenna selection in a feedback scheme; (iv) In order to use a transparent codebook for different ranks of the pre-coding matrix $W_i$, lower rank codebooks may be nested in the full-rank codebook. Specifically, lower rank codebooks may be a subset of the column space of the full-rank codebook $W_i$; (v) In order to lower implementation complexity, elements of the pre-coding matrix $W_i$ may be from a fixed signal constellation (QPSK or 8-PSK); and (vi) In order to reduce the peak to average power ratio (PAPR), elements of the pre-coding matrix may be limited to constant modulus, for example by choosing a suitable constant amplitude constellation, as in (v) above.

A codebook $\{W\}$ in accordance with various embodiments of the invention, may be constructed from a set of generating vectors, $\{u_i\}$, where each (column) vector $u_i$ may have $N_{TX}$ elements, which may be complex. In accordance with various embodiments of the invention, the elements of the generating vectors $u_i$ may be chosen randomly from a fixed constellation, for example QPSK, or 8-PSK.

From the set of generating vectors, $\{u_i\}$, pre-coding matrices may be generated according to the following relationship:

$$W_i = I - \frac{2}{\|u_i\|^2} u_i u_i^H \qquad (1)$$

$W_i$ may be defined as a projection matrix that may take a vector into a space orthogonal to $u_i$. From any codebook element, or pre-coding matrix, $W_i$, a reduced-rank pre-coding matrix may be obtained by using a subset of the columns from $W_i$. A codebook $\{W_i\}$ constructed in accordance with the above protocol may, for example, possess the properties (i), and (iv)-(vi) above. Properties (i), (v), and (vi) may be shown to be met by construction, in accordance with various embodiments of the invention. With regard to property (iii), the codebook may be augmented by the identity matrix, so that I∈{$W_i$}. For property (ii), desirable pairwise distance properties, it may be desirable to define an exemplary distance measure.

The pairwise distance d between elements of the codebook may be determined according to the following relationship:

$$d(W_i, W_l) = \frac{1}{n_{ss}} \sum_{m=1}^{n_{ss}} (1 - |\langle w_{i,m}, w_{l,m} \rangle|^2) \quad (2)$$

where $w_{i,m}$ is the m-th column of matrix $W_i$, and $\langle w_{i,m}, w_{l,m} \rangle = w_{i,m}^H w_{l,m}$ may be the inner product. The pairwise distance d, in accordance with an embodiment of the invention, provides a measure for how 'close' the matrices $W_l$ and $W_i$ may be. In most instances, in accordance with property (ii), the codebook elements may be relatively uniformly spaced so as to approximately uniformly sample the underlying space.

With regard to property (iv), reduced rank pre-coding matrices $W_i$ may be generated by selecting columns from the full-rank pre-coding matrices. An exemplary selection of low-rank codebooks may be illustrated in the table below, generated from a full-rank codebook {$H_i$} with elements $H_i$ of dimensions 4 by 4.

| Codebook index | Rank 1 | Rank 2 | Rank 3 | Rank 4 |
|---|---|---|---|---|
| 0 | $H_0$(:, 1) | $H_0$(:, [1, 2]) | $H_0$(:, [1, 2, 3]) | $H_0$ |
| 1 | $H_1$(:, 1) | $H_1$(:, [1, 2]) | $H_1$(:, [1, 2, 3]) | $H_1$ |
| 2 | $H_2$(:, 1) | $H_2$(:, [1, 2]) | $H_2$(:, [1, 2, 3]) | $H_2$ |
| 3 | $H_3$(:, 1) | $H_3$(:, [1, 2]) | $H_3$(:, [1, 2, 3]) | $H_3$ |
| 4 | $H_4$(:, 1) | $H_4$(:, [1, 2]) | $H_4$(:, [1, 2, 3]) | $H_4$ |
| 5 | $H_5$(:, 1) | $H_5$(:, [1, 2]) | $H_5$(:, [1, 2, 3]) | $H_5$ |
| 6 | $H_6$(:, 1) | $H_6$(:, [1, 2]) | $H_6$(:, [1, 2, 3]) | $H_6$ |
| 7 | $H_7$(:, 1) | $H_7$(:, [1, 2]) | $H_7$(:, [1, 2, 3]) | $H_7$ |
| 8 | $H_8$(:, 1) | $H_8$(:, [1, 2]) | $H_8$(:, [1, 2, 3]) | $H_8$ |
| 9 | $H_9$(:, 1) | $H_9$(:, [1, 2]) | $H_9$(:, [1, 2, 3]) | $H_9$ |
| 10 | $H_{10}$(:, 1) | $H_{10}$(:, [1, 2]) | $H_{10}$(:, [1, 2, 3]) | $H_{10}$ |
| 11 | $H_{11}$(:, 1) | $H_{11}$(:, [1, 2]) | $H_{11}$(:, [1, 2, 3]) | $H_{11}$ |
| 12 | $H_{12}$(:, 1) | $H_{12}$(:, [1, 2]) | $H_{12}$(:, [1, 2, 3]) | $H_{12}$ |
| 13 | $H_{12}$(:, 2) | $H_{12}$(:, [1, 3]) | $H_{12}$(:, [2, 3, 4]) | n/a |
| 14 | $H_{12}$(:, 3) | $H_{12}$(:, [1, 4]) | $H_{12}$(:, [1, 3, 4]) | n/a |
| 15 | $H_{12}$(:, 4) | $H_{12}$(:, [2, 4]) | $H_{12}$(:, [1, 2, 4]) | n/a |

Figure 3:
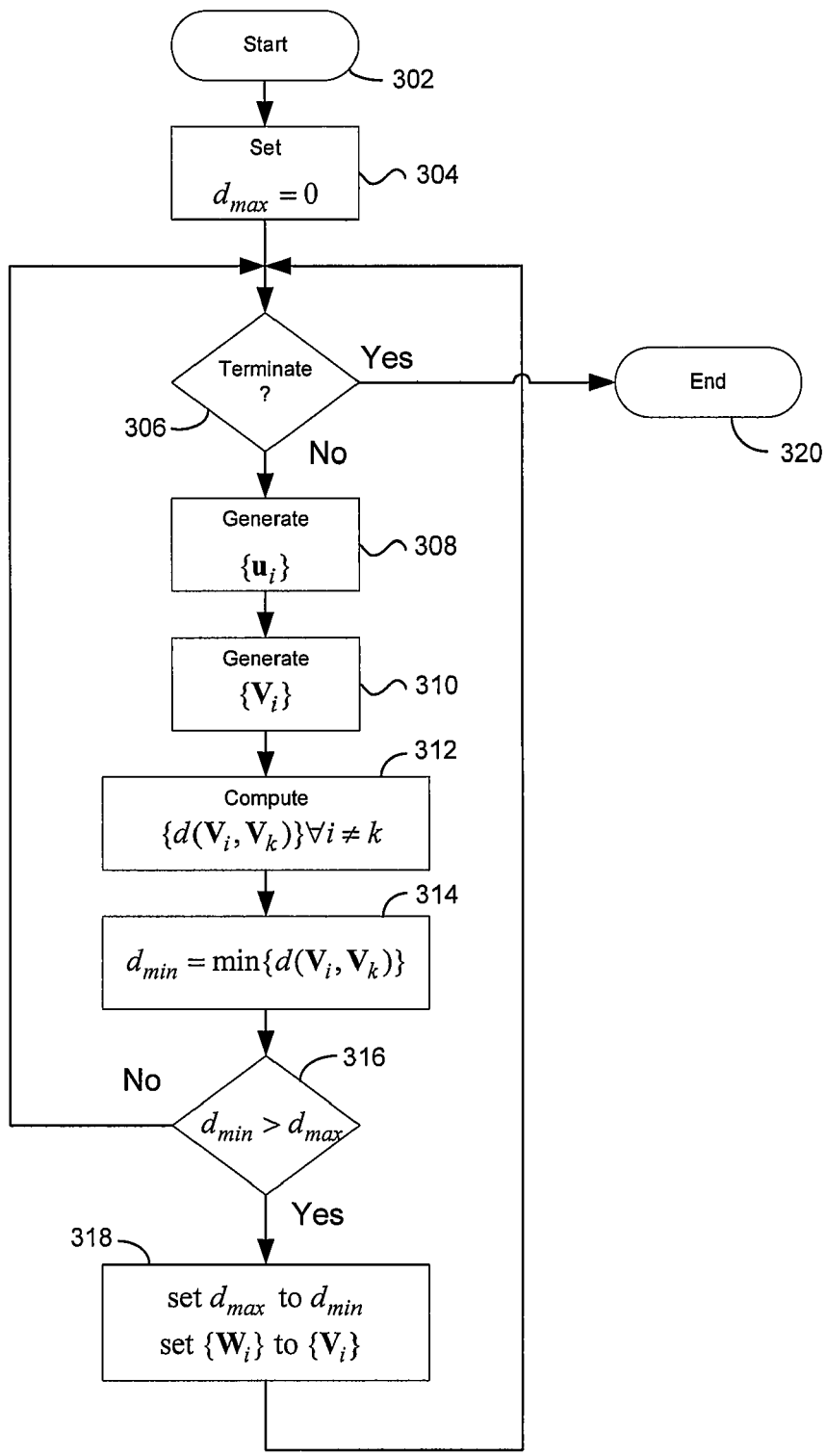
FIG. 3 is a flow chart illustrating exemplary generation of a codebook, in accordance with various embodiments of the invention.

FIG. 3 is a flow chart illustrating exemplary generation of a codebook, in accordance with various embodiments of the invention. The codebook generation process may be initialized in step 302. In step 304, a variable $d_{max}$ may be set to an initial value of zero, for example. A parameter $d_{max}$ may be used to keep track of the maximum of the minimum distance obtained for any generated codebook. In step 306, the exemplary protocol may determine whether a condition to terminate the loop has been met. For example, the loop may count the number of codebooks generated (in step 310), or may determine whether $d_{max}$ may have exceeded a certain value. The one or more termination conditions in step 306 may be defined arbitrarily. If a termination condition is met in step 306, the codebook generation loop may terminate, and the current best selected codebook may be selected. In this case, the codebook generation may terminate in step 320. If no termination condition is satisfied, a set of generating vectors may be generated in step 308. The generating vectors may be generated as described above, for example, with elements chosen randomly from a constellation, such as QPSK or 8-PSK.

In step 310, a codebook {$V_i$} may be generated from the generating vectors {$u_i$}, in accordance with equation (1) above. The codebook may also be augmented with the identity matrix. In step 312, a set of distance measures, {d($V_i$, $V_k$)}∀i≠k may be computed. That is, a set containing the distance between any two codebook elements $V_i$ and $V_k$ may be determined. In step 314, the minimum distance between any two codebook elements may be determined by computing $d_{min}$=min{d($V_i$, $V_k$)}. In step 316, the computed $d_{min}$ may be compared with the previous maximum value of $d_{min}$. If $d_{min}>d_{max}$, $d_{max}$ may be set to the value of $d_{min}$, and the selected codebook may become the current codebook, that is, {W} may be set to {V} in step 318. If, on the other hand, $d_{min}<d_{max}$, a previously generated codebook offered a greater minimum separation distance between the elements of the codebook. In this instance, the current codebook {V} may be discarded and a new codebook may be generated by restarting the process in step 306. By generating random generating vectors {$u_i$}, random codebooks {$V_i$}, may be generated. By keeping the codebook with the maximum $d_{min}$, a codebook with a most uniformly distributed codebook elements may be retained, in accordance with, for example property (ii), and various other embodiments of the invention.

Figure 4A:
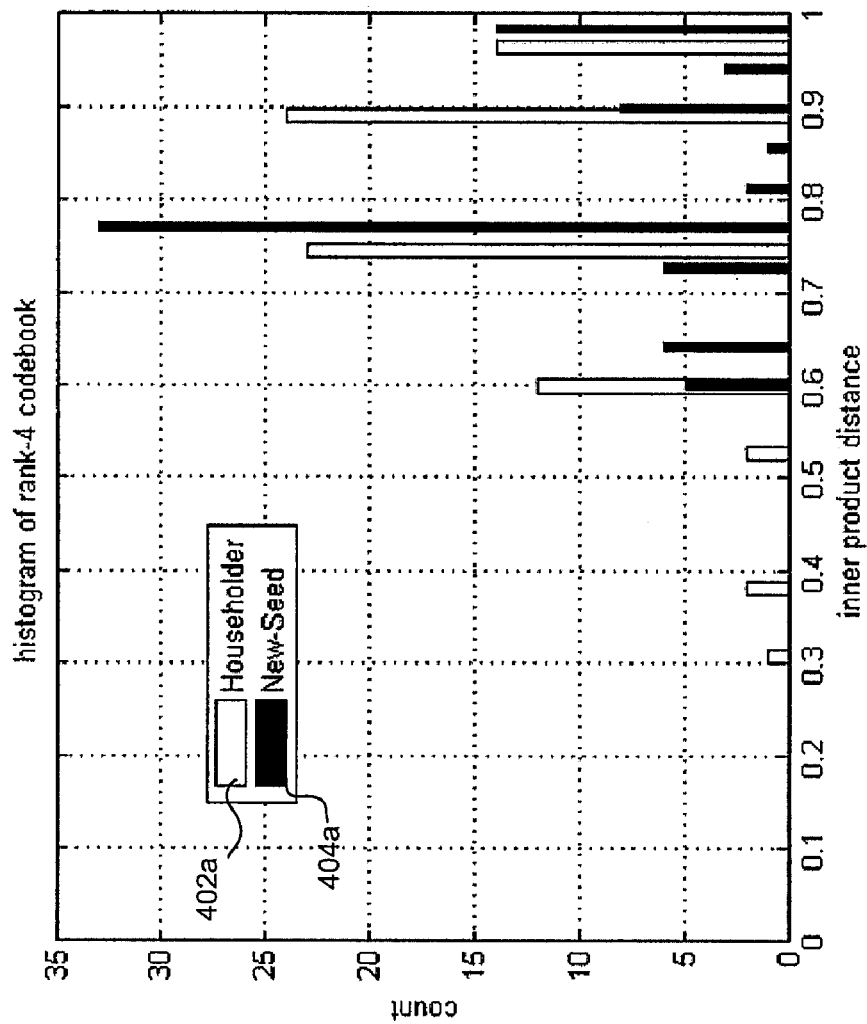
FIG. 4A is an exemplary histogram illustrating pair-wise distance properties for a rank-4 codebook, in accordance with an embodiment of the invention.

FIG. 4A is an exemplary histogram illustrating pair-wise distance properties for a rank-4 codebook, in accordance with an embodiment of the invention. Referring to FIG. 4A, there is shown a histogram for a householder codebook 402a, and a histogram for a codebook in accordance with an embodiment of the invention, with randomly generated generating vectors {$u_i$}, referred to as new seed codebook 404a ({$W_i$}). The x-axis may show distance d in accordance with equation (2), and the y-axis may show the frequency at which a certain distance d may occur. In accordance with various embodiments of the invention, the minimum pairwise distance between elements of the codebook may be large, and the distance between any pair of elements of the codebook varies little among different pairs, as described with respect to FIG. 3. Thus, the histogram as shown in FIG. 4A may be located as much to the right horizontally as achievable, and that the horizontal spread in the histogram may be small.

As illustrated in FIG. 4A, the new seed codebook 404a, in accordance with various embodiments of the invention, may be more concentrated, and centered at higher inner product distance d. Thus, the new seed codebook 404a may in general be considered to possess more desirable pairwise distance properties than a householder codebook 402a, as described above.

Figure 4B:
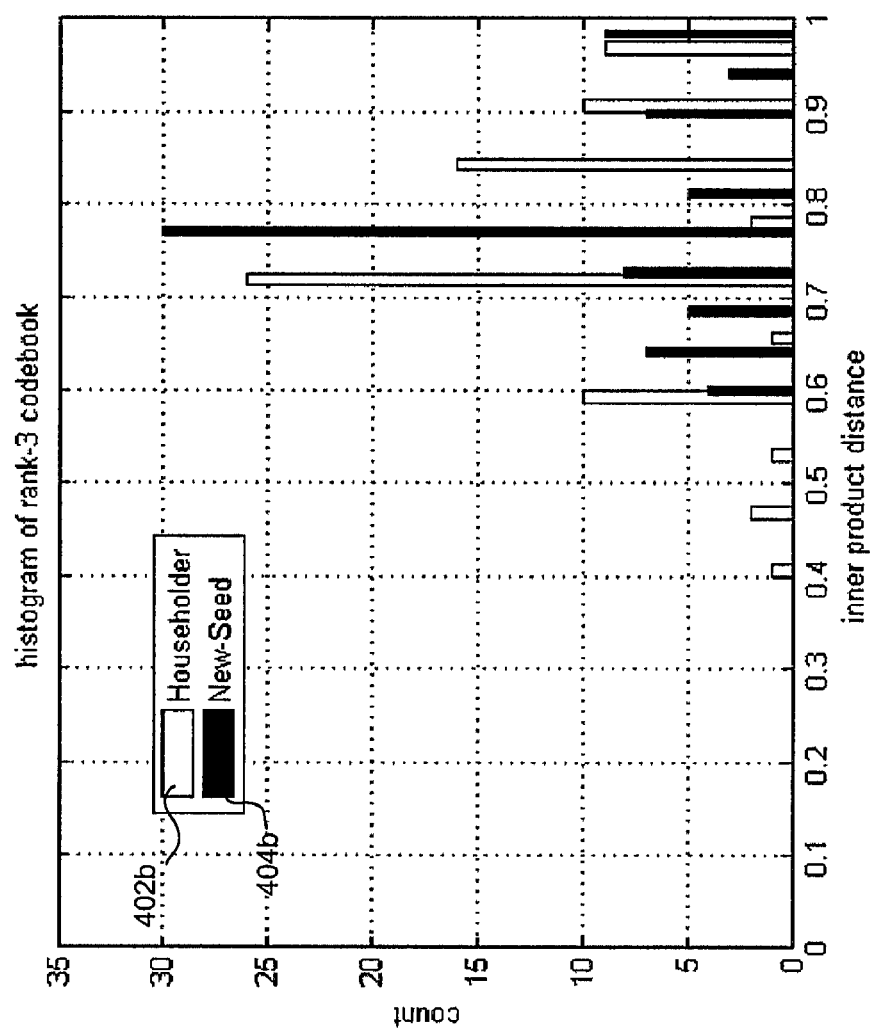
FIG. 4B is an exemplary histogram illustrating pair-wise distance properties for a rank-3 codebook, in accordance with an embodiment of the invention.

FIG. 4B is an exemplary histogram illustrating pair-wise distance properties for a rank-3 codebook, in accordance with an embodiment of the invention. Referring to FIG. 4B, there is shown a histogram for a householder codebook 402b, and a histogram for a codebook in accordance with an embodiment of the invention, with randomly generated generating vectors {$u_i$}, referred to as new seed codebook 404b ({$W_i$}). The x-axis may show distance d in accordance with equation (2), and the y-axis may show the frequency at which a certain distance d may occur. In accordance with various embodiments of the invention, the minimum pairwise distance between elements of the codebook may be large, and the distance between any pair of elements of the codebook varies little among different pairs, as described with respect to FIG. 3. Thus, the histogram as shown in FIG. 4B may be located as much to the right horizontally as achievable, and that the horizontal spread in the histogram may be small.

As illustrated in FIG. 4B, the new seed codebook 404b, in accordance with various embodiments of the invention, may be more concentrated, and centered at higher inner product distance d. Thus, the new seed codebook 404b may in general be considered to possess more desirable pairwise distance properties than a householder codebook 402b, as described above.

Figure 4C:
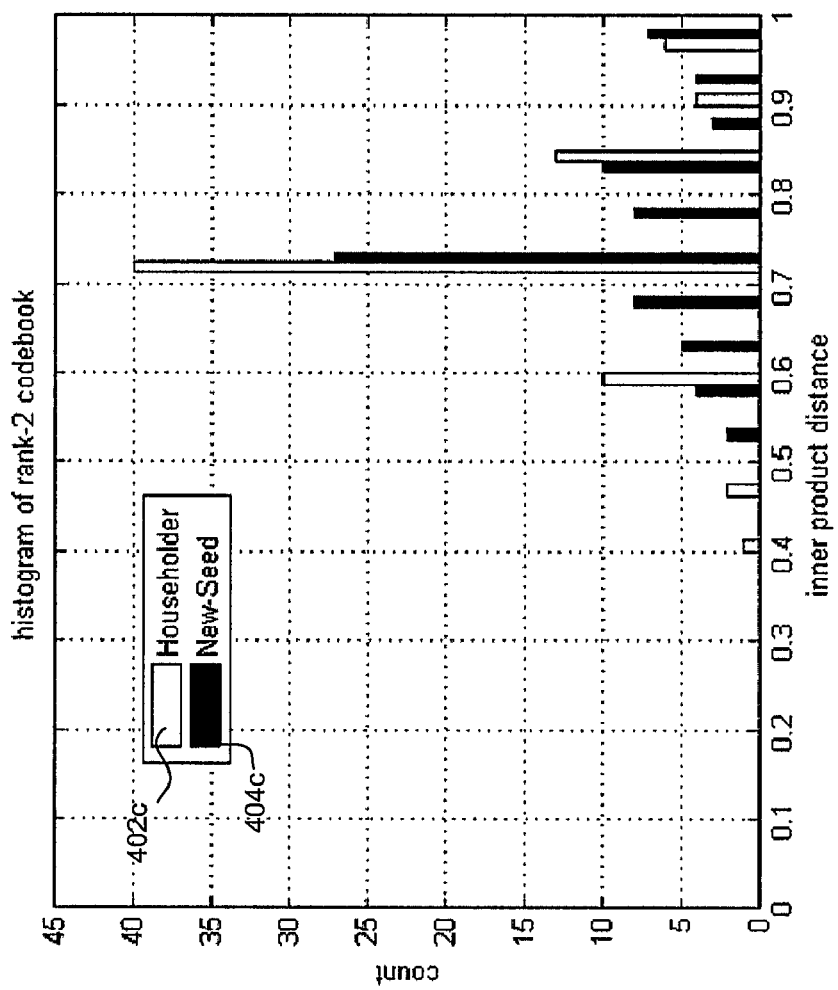
FIG. 4C is an exemplary histogram illustrating pair-wise distance properties for a rank-2 codebook, in accordance with an embodiment of the invention.

FIG. 4C is an exemplary histogram illustrating pair-wise distance properties for a rank-2 codebook, in accordance with an embodiment of the invention. Referring to FIG. 4C, there is shown a histogram for a householder codebook 402c, and a histogram for a codebook in accordance with an embodiment of the invention, with randomly generated generating vectors {u$_i$}, referred to as new seed codebook 404c ({W$_i$}). The x-axis may show distance d in accordance with equation (2), and the y-axis may show the frequency at which a certain distance d may occur. In accordance with various embodiments of the invention, the minimum pairwise distance between elements of the codebook may be large, and the distance between any pair of elements of the codebook varies little among different pairs, as described with respect to FIG. 3. Thus, the histogram as shown in FIG. 4C may be located as much to the right horizontally as achievable, and that the horizontal spread in the histogram may be small.

As illustrated in FIG. 4C, the new seed codebook 404c, in accordance with various embodiments of the invention, may be somewhat more concentrated, and centered at about the same inner product distance d as the householder codebook 402c. Thus, the new seed codebook 404c may in general be considered to possess more desirable pairwise distance properties than a householder codebook 402c, as described above.

Figure 4D:
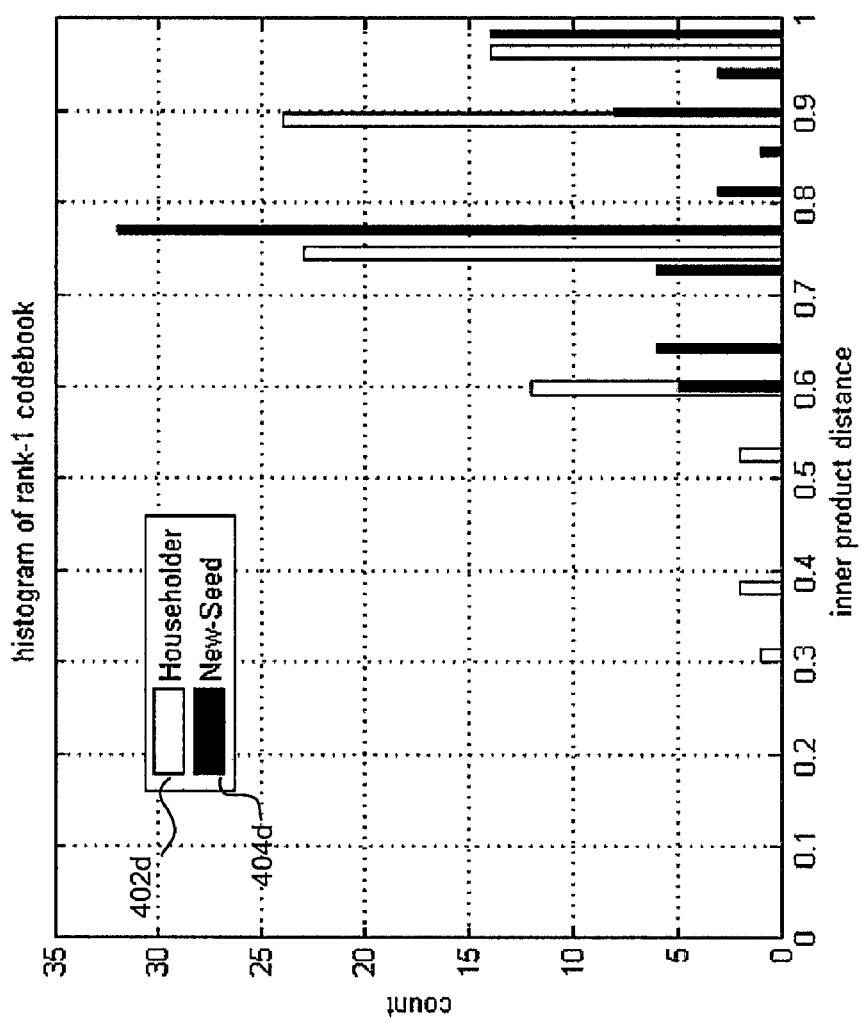
FIG. 4D is an exemplary histogram illustrating pair-wise distance properties for a rank-1 codebook, in accordance with an embodiment of the invention.

FIG. 4D is an exemplary histogram illustrating pair-wise distance properties for a rank-1 codebook, in accordance with an embodiment of the invention. Referring to FIG. 4D, there is shown a histogram for a householder codebook 402d, and a histogram for a codebook in accordance with an embodiment of the invention, with randomly generated generating vectors {u$_1$}, referred to as new seed codebook 404d ({W$_i$}). The x-axis may show distance d in accordance with equation (2), and the y-axis may show the frequency at which a certain distance d may occur. In accordance with various embodiments of the invention, the minimum pairwise distance between elements of the codebook may be large, and the distance between any pair of elements of the codebook varies little among different pairs, as described with respect to FIG. 3. Thus, the histogram as shown in FIG. 4D may be located as much to the right horizontally as achievable, and that the horizontal spread in the histogram may be small.

As illustrated in FIG. 4D, the new seed codebook 404d, in accordance with various embodiments of the invention, may be more concentrated, and centered at higher inner product distance d. Thus, the new seed codebook 404d may in general be considered to possess more desirable pairwise distance properties than a householder codebook 402d, as described above.

In accordance with an embodiment of the invention, a method and system for codebook design for pre-coding techniques may comprise generating one or more matrices {V} whose matrix elements are from a constant amplitude signal constellation, for example QPSK or 8-PSK, wherein each of the one or more generated matrices V$_i$ may comprise one or more orthonormal columns, and one of the generated one or more matrices may be an identity matrix, as described for FIG. 3. Any two of the generated one or more matrices may be separated by at least a minimum pairwise distance d, as illustrated in FIG. 4A-4D. One or more pre-coding codebooks {W$_i$} may be generated, each of which may comprise one or more codebook elements W$_i$ that may be of a same matrix rank. As described with reference to FIG. 2 and FIG. 3, each of the codebook elements W$_i$ may be generated from a subset of columns from one of the generated one or more matrices, for example V$_i$. A signal may be pre-coded for transmission using the one or more pre-coding codebooks, as illustrated in FIG. 2.

The generated one or more matrices may be selected from a plurality of sets of one or more matrices based on the minimum pairwise distance d, as described for FIG. 3. The minimum pairwise distance d may be set to an arbitrary value. The one or more matrices, for example {V$_i$}, may be generated from a set of generating vectors {u$_i$}, using a householder transformation, wherein elements of the set of generating vectors may be selected randomly from the constant amplitude signal constellation. The householder transformation may be defined by a following relationship:

$$W_i = I - \frac{2}{\|u_i\|^2} u_i u_i^H$$

where W$_i$ may be one of the one or more matrices, I may be the identity matrix, and u$_i$ may be one of the set of generating vectors. The constant amplitude signal constellation may be a QPSK or an 8-PSK signal constellation. The minimum pairwise distance may be defined by a following distance measure relationship:

$$d(W_i, W_l) = \frac{1}{n_{ss}} \sum_{m=1}^{n_{ss}} (1 - |\langle w_{i,m}, w_{l,m}\rangle|^2)$$

where W$_i$ and W$_l$ may be two matrices of the one or more matrices, n$_{ss}$ may be the rank of the one or more matrices, <·> may denote a matrix inner product, and w$_{i,m}$ may be the m-th column of matrix W$_i$. The one or more matrices may be unitary when the one or more matrices are square matrices. The transmission signal may comprise a number of spatial streams equal to the matrix rank of the codebook elements of the one or more pre-coding codebooks used to generate the transmission signal, as described for FIG. 1B and FIG. 2.

Another embodiment of the invention may provide a machine-readable storage, having stored thereon, a computer program having at least one code section executable by a machine, thereby causing the machine to perform the steps as described above for a method and system for codebook design for pre-coding techniques.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following:

a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing communication signals, the method comprising:
   generating one or more matrices whose matrix elements are from a constant amplitude signal constellation, wherein each of said one or more generated matrices comprise one or more orthonormal columns, and one of said generated one or more matrices is an identity matrix, and any two of said generated one or more matrices are separated by at least a minimum pairwise distance;
   generating one or more pre-coding codebooks, each of which comprises one or more codebook elements that are of a same matrix rank, and each of said codebook elements is generated from a subset of columns from one of said generated one or more matrices; and
   pre-coding a signal for transmission using said one or more pre-coding codebooks.

2. The method according to claim 1, comprising selecting said generated one or more matrices from a plurality of sets of one or more matrices based on said minimum pairwise distance.

3. The method according to claim 2, comprising setting said minimum pairwise distance to an arbitrary value.

4. The method according to claim 1, comprising generating said one or more matrices from a set of generating vectors, using a householder transformation.

5. The method according to claim 4, wherein elements of said set of generating vectors are selected randomly from said constant amplitude signal constellation.

6. The method according to claim 4, wherein said householder transformation is defined by a following relationship:

$$W_i = I - \frac{2}{\|u_i\|^2} u_i u_i^H$$

where $W_i$ is one of said one or more matrices, $I$ is the identity matrix, and $u_i$ is one of said set of generating vectors.

7. The method according to claim 1, wherein said constant amplitude signal constellation is a QPSK or an 8-PSK signal constellation.

8. The method according to claim 1, wherein said minimum pairwise distance is defined by a following distance measure relationship:

$$d(W_i, W_l) = \frac{1}{n_{ss}} \sum_{m=1}^{n_{ss}} (1 - |\langle w_{i,m}, w_{l,m} \rangle|^2)$$

where $W_i$ and $W_l$ are two matrices of said one or more matrices, $n_{ss}$ is a rank of said one or more matrices, $\langle . \rangle$ denotes a matrix inner product, and $w_{i,m}$ is an m-th column of matrix $W_i$.

9. The method according to claim 1, wherein said one or more matrices are unitary when said one or more matrices are square matrices.

10. The method according to claim 1, wherein said transmission signal comprises a number of spatial streams equal to said matrix rank of said codebook elements of said one or more pre-coding codebooks used to generate said transmission signal.

11. A system for processing communication signals, the system comprising:
    one or more circuits, said one or more circuits enable:
    generation of one or more matrices whose matrix elements are from a constant amplitude signal constellation, wherein each of said one or more generated matrices comprise one or more orthonormal columns, and one of said generated one or more matrices is an identity matrix, and any two of said generated one or more matrices are separated by at least a minimum pairwise distance;
    generation of one or more pre-coding codebooks, each of which comprises one or more codebook elements that are of a same matrix rank, and each of said codebook elements is generated from a subset of columns from one of said generated one or more matrices; and
    pre-coding of a signal for transmission using said one or more pre-coding codebooks.

12. The system according to claim 11, wherein said one or more circuits select said generated one or more matrices from a plurality of sets of one or more matrices based on said minimum pairwise distance.

13. The system according to claim 12, wherein said one or more circuits set said minimum pairwise distance to an arbitrary value.

14. The system according to claim 11, wherein said one or more circuits generate said one or more matrices from a set of generating vectors, using a householder transformation.

15. The system according to claim 14, wherein elements of said set of generating vectors are selected randomly from said constant amplitude signal constellation.

16. The system according to claim 14, wherein said householder transformation is defined by a following relationship:

$$W_i = I - \frac{2}{\|u_i\|^2} u_i u_i^H$$

where $W_i$ is one of said one or more matrices, $I$ is the identity matrix, and $u_i$ is one of said set of generating vectors.

17. The system according to claim 11, wherein said constant amplitude signal constellation is a QPSK or an 8-PSK signal constellation.

18. The system according to claim 11, wherein said minimum pairwise distance is defined by a following distance measure relationship:

$$d(W_i, W_l) = \frac{1}{n_{ss}} \sum_{m=1}^{n_{ss}} (1 - |\langle w_{i,m}, w_{l,m} \rangle|^2)$$

where $W_i$ and $W_l$ are two matrices of said one or more matrices, $n_{ss}$ is a rank of said one or more matrices, <.> denotes a matrix inner product, and $w_{i,m}$ is an m-th column of matrix $W_i$.

19. The system according to claim 11, wherein said one or more matrices are unitary when said one or more matrices are square matrices.

20. The system according to claim 11, wherein said transmission signal comprises a number of spatial streams equal to said matrix rank of said codebook elements of said one or more pre-coding codebooks used to generate said transmission signal.

* * * * *